(12) United States Patent
Paila et al.

(10) Patent No.: US 8,068,832 B2
(45) Date of Patent: Nov. 29, 2011

(54) MULTICAST SESSION HANDOVER

(75) Inventors: Toni Paila, Espoo (FI); Jani Paikela, Helsinki (FI); Lin Xu, Tampere (FI); Juha-Pekka Luoma, Tampere (FI); Rod Walsh, Tampere (FI)

(73) Assignee: Nokia Corporation, Espoo (FI)

( * ) Notice: Subject to any disclaimer, the term of this patent is extended or adjusted under 35 U.S.C. 154(b) by 1075 days.

(21) Appl. No.: 09/988,241

(22) Filed: Nov. 19, 2001

(65) Prior Publication Data
US 2003/0100325 A1 May 29, 2003

(51) Int. Cl.
*H04W 36/00* (2009.01)
(52) U.S. Cl. .................. 455/436; 455/503; 455/524
(58) Field of Classification Search .............. 455/506, 455/436–439, 442, 101, 500, 517, 422.1, 455/428, 429, 187.1, 414.1, 424, 432.1–432.3, 455/435.2, 444, 503, 515, 524; 370/432, 370/390, 270, 328–350; 713/163
See application file for complete search history.

(56) References Cited

U.S. PATENT DOCUMENTS

| | | | |
|---|---|---|---|
| 4,872,157 A | 10/1989 | Hemmady et al. | |
| 4,872,158 A | 10/1989 | Richards | |
| 4,872,159 A | 10/1989 | Hemmady et al. | |
| 4,872,160 A | 10/1989 | Hemmady et al. | |
| 4,875,206 A | 10/1989 | Nichols et al. | |
| 4,893,302 A | 1/1990 | Hemmady et al. | |
| 4,894,824 A | 1/1990 | Hemmady et al. | |
| 4,896,319 A | 1/1990 | Lidinsky et al. | |
| 4,897,874 A | 1/1990 | Lidinsky et al. | |
| 4,899,333 A | 2/1990 | Roediger | |
| 4,922,486 A | 5/1990 | Lidinsky et al. | |
| 4,942,574 A | 7/1990 | Zelle | |
| 4,958,341 A | 9/1990 | Hemmady et al. | |
| 4,997,582 A | 3/1991 | Clark, Jr. et al. | |
| 5,774,465 A * | 6/1998 | Lau et al. | 370/395.3 |
| 5,778,187 A | 7/1998 | Monteiro et al. | |
| 5,857,072 A | 1/1999 | Crowle | |
| 5,867,494 A | 2/1999 | Krishnaswamy et al. | |
| 5,867,495 A | 2/1999 | Elliott et al. | |
| 5,970,473 A | 10/1999 | Gerszberg et al. | |

(Continued)

FOREIGN PATENT DOCUMENTS

EP 0507096 A2 10/1992

(Continued)

OTHER PUBLICATIONS

"Internet Protocol (IP) Multicast", Technology Overview, 15 pages, printed on Sep. 18, 2001 from ftp://ftpeng.cisco.com/ipmulticast/whitepapers/technology_overview/index.html.

(Continued)

*Primary Examiner* — Dominic E Rego
(74) *Attorney, Agent, or Firm* — Banner & Witcoff, Ltd.

(57) ABSTRACT

A method and system for performing multicast broadcast handover in a wireless data network are disclosed. Each cell broadcasts administrative announcements over a logical channel to mobile terminals. The announcements indicate which multicast broadcasts are available in specified cells, as well as connection information for each cell. The mobile terminals may tune to a multicast broadcast as defined by the administrative announcements. While tuned to the multicast, the mobile terminal continues to receive administrative announcements. As the broadcast fades out or is otherwise interrupted, the mobile terminal can retune to the same multicast broadcast in another cell, based on the cell connection information included in the previously received administrative announcements.

50 Claims, 5 Drawing Sheets

U.S. PATENT DOCUMENTS

| | | | |
|---|---|---|---|
| 5,983,005 | A | 11/1999 | Monteiro et al. |
| 5,999,525 | A | 12/1999 | Krishnaswamy et al. |
| 6,014,381 | A | 1/2000 | Troxel et al. |
| 6,085,101 | A | 7/2000 | Jain et al. |
| 6,104,709 | A * | 8/2000 | Rinchiuso et al. ............ 370/335 |
| 6,105,099 | A | 8/2000 | Freitas et al. |
| 6,108,706 | A | 8/2000 | Birdwell et al. |
| 6,112,279 | A | 8/2000 | Wang |
| 6,119,163 | A | 9/2000 | Monteiro et al. |
| 6,154,463 | A * | 11/2000 | Aggarwal et al. ............ 370/408 |
| 6,185,288 | B1 | 2/2001 | Wong |
| 6,205,139 | B1 | 3/2001 | Voit |
| 6,215,790 | B1 | 4/2001 | Voit et al. |
| 6,222,520 | B1 | 4/2001 | Gerszberg et al. |
| 6,226,684 | B1 * | 5/2001 | Sung et al. .................... 709/238 |
| 6,236,365 | B1 | 5/2001 | LeBlanc et al. |
| 6,240,078 | B1 | 5/2001 | Kuhnel et al. |
| 6,252,862 | B1 * | 6/2001 | Sauer et al. .................... 370/331 |
| 6,259,683 | B1 * | 7/2001 | Sekine et al. ................. 370/328 |
| 6,307,861 | B1 * | 10/2001 | Hogg et al. .................... 370/432 |
| 6,484,209 | B1 * | 11/2002 | Momirov ....................... 709/238 |
| 6,519,455 | B1 * | 2/2003 | McCormick et al. ........ 455/438 |
| 6,532,233 | B1 * | 3/2003 | Matsunaga et al. .......... 370/390 |
| 6,728,531 | B1 * | 4/2004 | Lee et al. ....................... 455/419 |
| 6,731,936 | B2 | 5/2004 | Chen et al. .................... 455/437 |
| 6,865,167 | B2 * | 3/2005 | Famolari et al. ............. 370/331 |
| 6,988,146 | B1 * | 1/2006 | Magret et al. ................. 709/238 |
| 7,072,289 | B1 * | 7/2006 | Yang et al. .................... 370/208 |
| 7,072,317 | B2 * | 7/2006 | Vakil et al. .................... 370/332 |
| 7,339,928 | B2 * | 3/2008 | Choyi et al. .................. 370/390 |
| 2001/0036834 | A1 * | 11/2001 | Das et al. ....................... 455/458 |
| 2002/0142757 | A1 * | 10/2002 | Leung et al. .................. 455/412 |
| 2002/0142759 | A1 * | 10/2002 | Newell et al. ................. 455/414 |
| 2003/0073453 | A1 * | 4/2003 | Basilier ......................... 455/503 |
| 2004/0233883 | A1 * | 11/2004 | Ludwig et al. ................ 370/338 |

FOREIGN PATENT DOCUMENTS

| | | |
|---|---|---|
| EP | 0 823 827 A2 | 2/1998 |
| WO | 9943109 | 8/1999 |
| WO | WO 00/54475 | 9/2000 |
| WO | WO 01/13578 A1 | 2/2001 |
| WO | 0145308 A2 | 6/2001 |
| WO | 0147237 | 6/2001 |
| WO | WO 01/58053 A1 | 8/2001 |

OTHER PUBLICATIONS

M. Handley et al., "SDP: Session Description Protocol", 36 pages, printed on Oct. 29, 2001 from http://www.ietf.org/rfc/rfc2327.txt?number=2327.

B. Quinn, "IP Multicast Applications: Challenges and Solutions", 27 pages, printed on Nov. 12, 2001 from http://www.ietf.org/rfc/rfc3170.txt?number=3170.

Giovanardi, A., Mazzini, G., Rossi, M., "An Agent-based Approach for Multicast Applications in Mobile Wireless Networks", 2000 IEEE Global Telecommunications Conference, San Francisco, CA, Nov. 27-Dec. 1, 2000, pp. 1682-1686.

EP Search Report dated Jan. 19, 2007, EP Application No. 02775040.5-1224, PCT/IB0204012.

* cited by examiner

MULTICAST SESSION HANDOVER

FIELD OF THE INVENTION

The invention relates generally to wireless data network systems. More precisely the invention relates to performing multicast session handovers from one cell to another in a wireless system.

BACKGROUND OF THE INVENTION

Wireless data networking allows users to receive data packets from virtually any location served by a wireless telecommunications provider. For instance, using GSM digital cellular phone service, mobile users can send and receive short message service (SMS) messages, browse the Internet, receive news and stock quote information, and send and receive email. Similar services are becoming available for other telecommunications services.

Wireless data packets may be sent to multiple mobile terminals at the same time, referred to as multicasting. Currently, systems such as WLAN, digital video broadcast (DVB) systems and digital audio broadcast (DAB) systems can be used to transfer multicasted data. In the future, UMTS or GPRS networks may also have the capability of supporting IP multicasting.

In order for a wireless system to hand over a mobile terminal from one cell to another while receiving a multicast session, the mobile terminal generally must scan all the possible frequencies to find the available neighboring broadcast cells (or channels) and check which neighboring cells (or channels) support its on-going multicast session. The time consumed for finding a cell that supports its on-going session may result in significant packet loss during handover. There is presently no means by which a mobile terminal can automatically or intelligently hand off a multicast session from one cell to another without performing the above mentioned extensive scanning. Thus, a method and system enabling a mobile terminal to make intelligent channel selections based on a repository of session information is needed.

BRIEF SUMMARY OF THE INVENTION

The invention provides a method for performing multicast session handovers in a wireless network. A mobile terminal receives logical mapping messages that announce the presence of a multicast session. The terminal joins the session and, while receiving messages, receives updated logical mappings regarding multicast session contents in the same and neighboring cells. When the current cell's signal fades or is otherwise lost, or when any other predetermined condition occurs, the logical mappings are used to select a new physical or logical cell from which to receive the multicast session.

A first embodiment of the invention provides a method, mobile terminal, and computer readable medium that perform multicast session handover in a wireless network. A mobile terminal receives a multicast session announcement over an announcement channel in a first cell, where the multicast session announcement includes multicast session information for first and second cells. The mobile terminal tunes to a multicast session in the first cell using the multicast session information provided in the multicast session announcement. When a multicast session metric condition is met, such as a signal strength fading from a usable signal strength, the mobile terminal tunes to the multicast session signal broadcast by the second cell using the multicast session information provided in the multicast session announcement.

In various embodiments of the invention, the multicast session announcement may include one or more of a session identifier, a list of cells in which the session is available, a session access information (frequency, hop rate, etc.), and a session title. The multicast session information may also include detailed link-level access parameters for each cell in which a session is available.

DETAILED DESCRIPTION OF THE INVENTION

Figure 1:
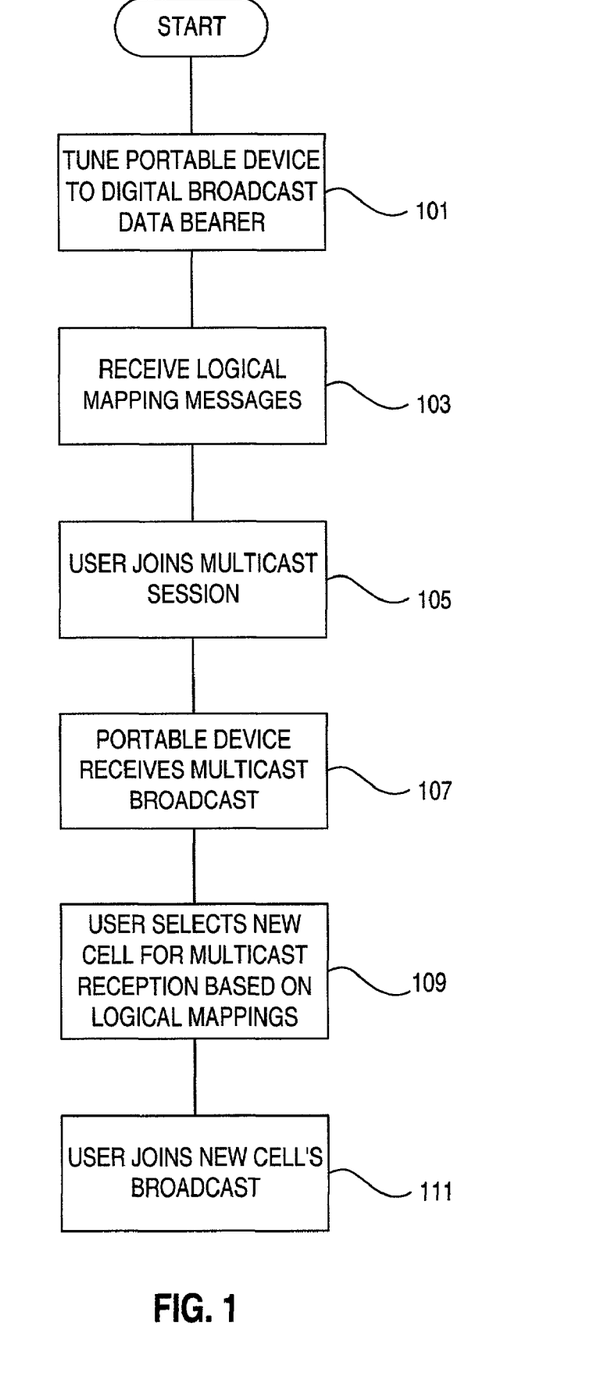
FIG. 1 illustrates a general method according to an embodiment of the invention.

With reference to FIG. 1, an end user tunes a mobile terminal (e.g., mobile telephone, PDA, or other terminal device) to a digital broadcast data bearer, in step 101. A broadcast data bearer may be defined as a cell in a network of a specific access type, e.g., the cell HelsinkiAirportLounge of type WLAN. A cell may be defined as any service area for a mobile terminal. The mobile terminal receives logical mapping messages, in step 103, that announce a presence of one or more multicast sessions in the cell. The broadcast service may be a unidirectional IP multicast session. However, one of skill in the art will appreciate that the invention may also be used with bidirectional multicast sessions that use return channels. The mobile terminal joins a session, in step 105, and starts receiving the multicast broadcast in step 107.

While receiving the broadcast, the mobile terminal periodically receives administrative messages with updated information about multicast sessions in neighboring horizontal or vertical cells. Horizontal cells are cells within the same network type, e.g., cells 203, 205 in FIG. 2. Vertical cells are cells of different access types (e.g., DVB-T and GPRS) that, optionally, cover the same geographic area. As the mobile terminal moves beyond the edge of the current cell's coverage area, the reception fades out if no action is taken. Thus, the mobile terminal may switch reception to a new cell's multicast session in order to continue receiving the broadcast. As reception of the current bearer signal diminishes (e.g., as a result of errors, fadeout, etc.) the mobile terminal may use the gathered logical mappings to select a new physical or logical cell (as are known in the art), from which to receive the multicast, in step 109. After selecting a new physical or logical cell the mobile terminal joins the new cell's session and begins receiving the multicast in step 111.

The inventive methods are described with respect to the TCP/IP networking suite, and more specifically, with respect to known IP multicasting techniques such as IGMP. However, one of skill in the art will appreciate that the inventive method and system may be adapted for use with any data networking protocol.

The above method may also be used in a hybrid radio network consisting of multiple standalone radio access systems. The radio access systems may be administratively independent, or they may be related in some manner. For example, each broadcast network may advertise (via session and mapping announcements) only those multicast sessions broadcast by that network's cells. Other networks, however, may advertise multicast sessions available in that as well as other networks. Thus, the method may be used in heterogeneous radio access systems to transparently provide multimedia multicast services to end-users.

As referred to above, one or more embodiments of the invention may provide various types of administrative announcements that include session, mapping, topology, and link-level parameter information. Session information includes session titles, subject matter, provider, multicast IP address, and other session specific information. Mapping information may include a lookup table, database, list, or the like, indicating in which cells each session may be received. Topology information may include logical cell information, e.g., mapping logical cells to physical cells. Link-level parameters include any information that a multicast receiver needs to connect to and receive a multicast session from a digital broadcast data bearer.

In one embodiment of the invention, the broadcast system sends a single administrative announcement comprising session, mapping, topology, and link-level information. In another embodiment, the system may broadcast four types of announcements, one administrative announcement for each type of information (e.g., one for session information, one for mapping information, etc.). Obviously, other systems may provide other configurations of administrative announcement (e.g., two announcements, three announcements, etc.) to provide the same or similar information to each mobile terminal. Known systems that may be adapted or extended include DVB-SI, SDP/SAP, and XML schema-based systems. In one embodiment, announcements may be broadcast using Session Description Protocol (SDP) (See IETF RFC 2327). However, other session announcement/service discovery protocols that can relay session information may also be used.

In one embodiment of the invention, the administrative announcements may include link-level information such as physical parameters of a cell (frequency, MAC address, timeslots, etc.), as well as descriptions of logical session mappings that mobile terminals may use to connect to sessions as requested by a user. For a given multicast IP session, the announcement system may provide a list of those physical and/or logical cells in which the session may be received or, alternatively, the announcement system may provide a list of those multicast IP sessions that are supported in a given cell, along with a list of each session's multicast IP address.

Figure 2:
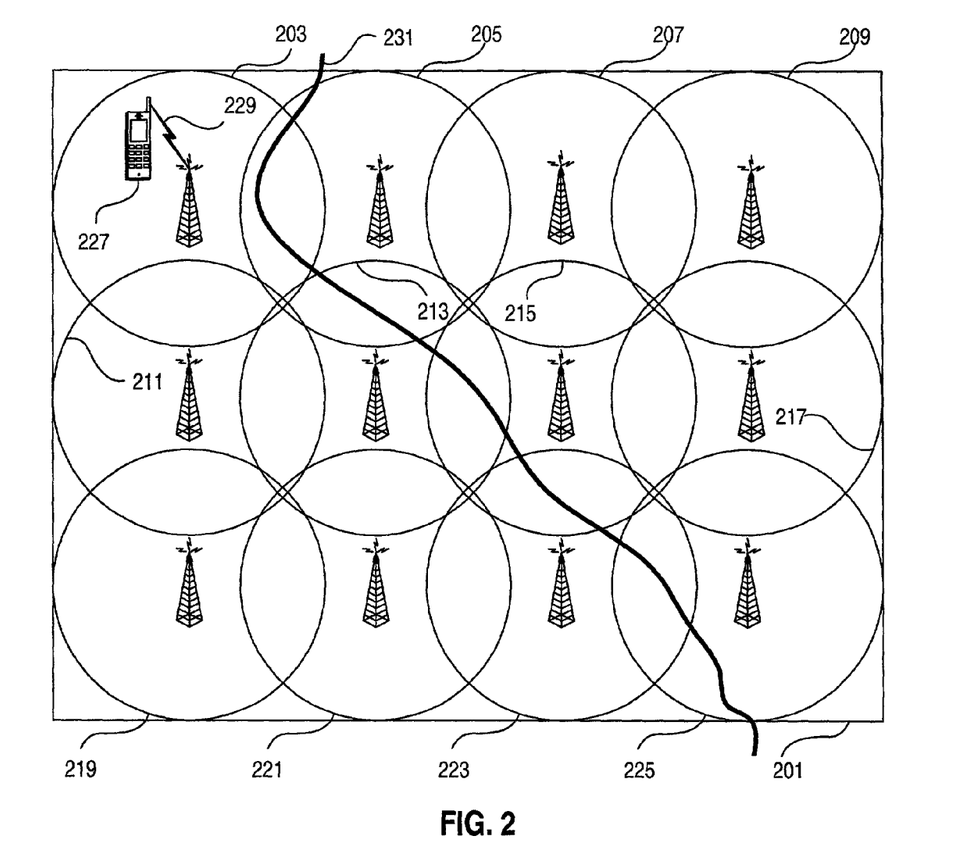
FIG. 2 illustrates a portion of a broadcast network in which handover may be performed according to an embodiment of the invention.

FIG. 2 illustrates a broadcast network 201 made up of multiple cells 203-225. A user's mobile terminal 227 may connect to and receive information from any cell 203-225 within the network, e.g., cell 203. Mobile terminal 227 may receive administrative announcements from broadcast network 201 via a logical announcement channel 229. The logical announcement channel may be predefined or it may be a dynamically configured IP multicast address. Road 231, representing a possible path of mobile terminal 227, runs through broadcast network 201.

In one embodiment of the invention, mobile terminal 227 is a GSM mobile terminal, and network 201 is a GSM wireless communications network. However, it should be appreciated by one of skill in the art that other wireless systems may also be used, such as DVB, DVB-T, CDMA, GPRS, DECT, UMTS, WLAN and the like. In some embodiments, hybrid systems may be used, such as a DVB-T unidirectional broadcast system in conjunction with a GSM wireless network for receiving upstream messages and requests from the mobile terminal.

Figure 3:
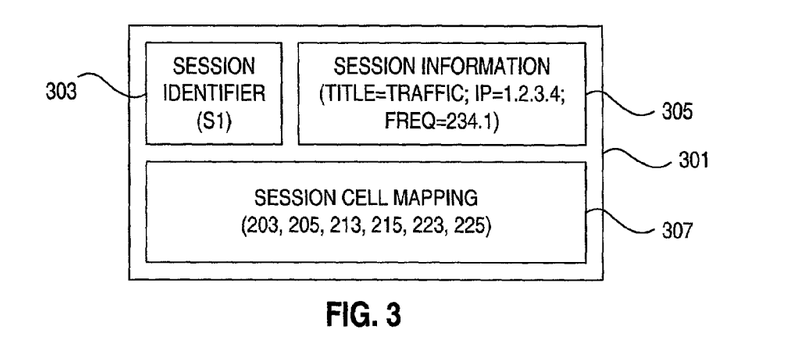
FIG. 3 illustrates a block diagram of a session announcement message according to an embodiment of the invention.

In one embodiment, the information that the mobile terminal receives over logical announcement channel 229 may include session information in the form of specific SDP announcements, such as is illustrated in FIG. 3. Each SDP announcement 301 may include a session identifier 303, session information 305, and session cell mapping 307. Session identifier 303 may be an identifier that identifies the session to which the specific session announcement 301 refers. In a preferred embodiment, session identifier 303 remains constant for the same multicast session across cells. That is, each cell broadcasting the same multicast uses the same session identifier for that multicast. Session information 305 may also store metadata regarding each session, such as a session title, multicast IP address, subject, broadcast frequency, and time duration/limits. In some embodiments, session information 305 may also include link-level access parameters that a mobile terminal uses to establish a connection in a specific cell to receive that session. Session cell mapping 307 indicates those cells in which the session with the specified session identifier is available. In one embodiment of the invention (not shown), link-level access parameters for each cell in which the session is broadcast are included with session cell mapping information 307, instead of with session information 305.

In one embodiment, SDP announcement 301 may contain the following information:

| | |
|---|---|
| Session Identifier: | S1 |
| Session Information: | Title = Traffic Information |
| | Multicast IP Address: 1.2.3.4 |
| | Frequency = 234.1 MHz |
| Session Cell Mapping: | 203, 205, 213, 215, 223, 225 |

Thus, mobile terminal 227 may receive SDP announcement 301 indicating that session S1 is broadcasting traffic information over 234.1 MHz in cells 203, 205, 213, 215, 223, and 225, which correspond to the cells through which road 231 passes. Using the information broadcast in the session and mapping announcements, mobile terminal 227 may tune in and receive broadcasts regarding traffic information. Alternatively, broadcasts may be made using CDMA codes or other modulation parameters sufficient to tune to a communication channel, instead of providing a specific frequency.

Figure 4:
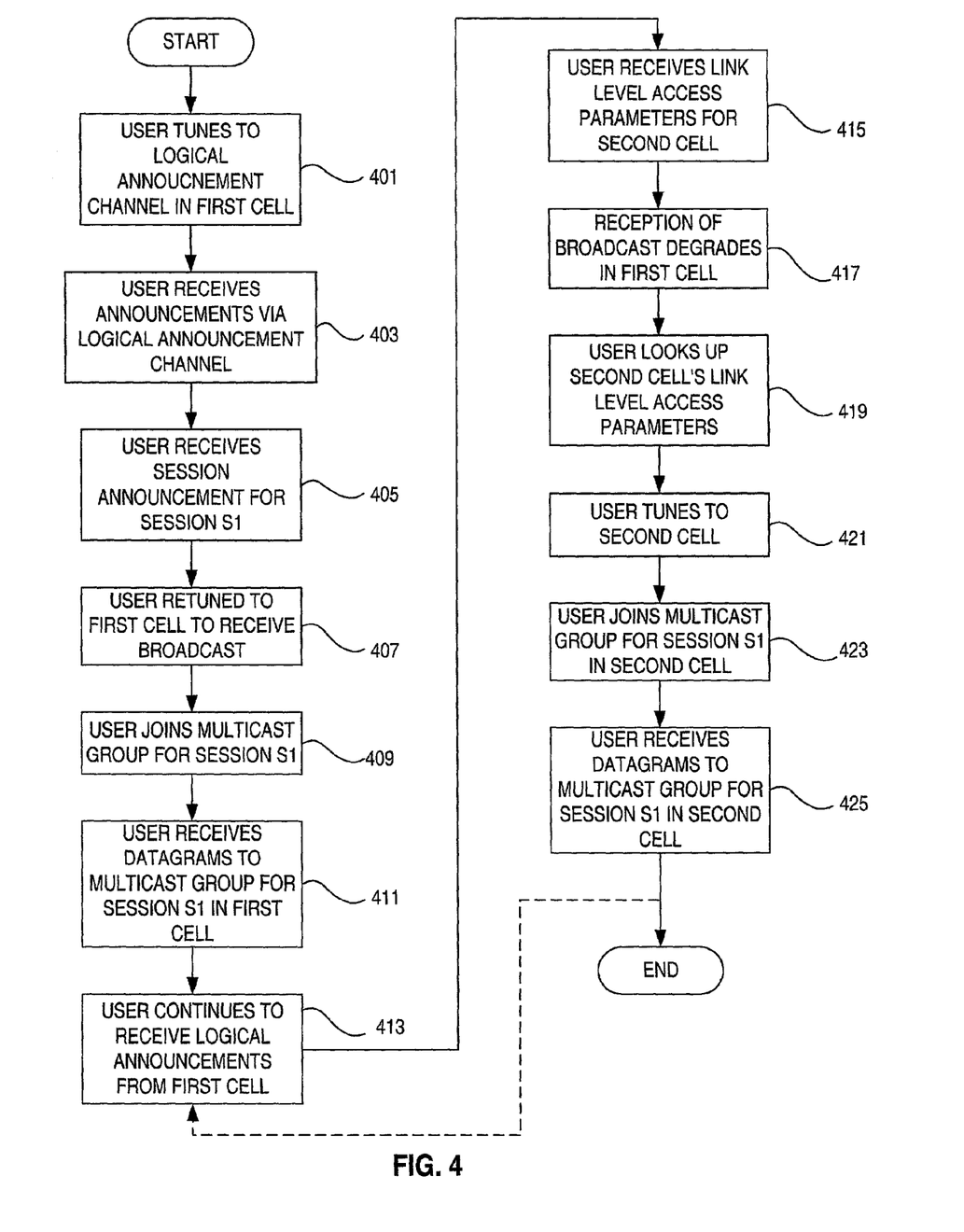
FIG. 4 illustrates a detailed method according to an embodiment of the invention.
Figure 5:
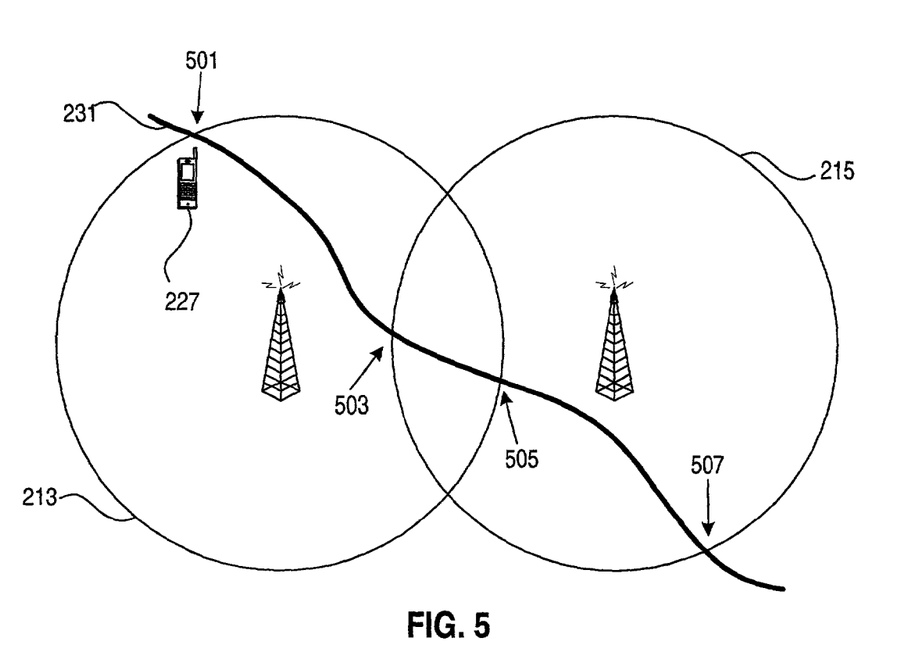
FIG. 5 illustrates an enlarged portion of the broadcast network illustrated in FIG. 2.

Reference is now made to FIGS. 4 and 5. FIG. 4 illustrates a detailed method for performing multicast broadcast handovers from one cell to another, while FIG. 5 illustrates an enlarged portion of broadcast network 201.

In step 401, as mobile terminal 227 enters first cell 213 on road 231 at location 501 (traveling towards location 507), mobile terminal 227 tunes to a logical announcement channel in first cell 213. While FIG. 4 illustrates a single logical announcement channel, one of normal skill in the art will appreciate that this channel may span several physical media. For example, a terminal may construct its logical announcement channel from two logical channels over two WLAN cells and three logical channels over a single DVB-T cell.

Mobile terminal 227 begins receiving one or more types of administrative announcements containing session, mapping, topology, and link-level parameter information in step 403. In step 405, mobile terminal 227 receives a specific announcement for a broadcast with session identifier "S1" and associated session information and session cell mapping. Each announcement may also include detailed link-level access parameters of first cell 213 and, optionally, detailed link-level access parameters of other cells in which the session is available.

In one embodiment of the invention, multiple cell information to include in administrative announcements is coordinated by a central server. That is, a central server instructs each cell as to which other cells' information to include in administrative announcements. In another embodiment of the invention, each cell may learn other cells' information by listening to other cells' administrative announcements. The choice of which cells' information to rebroadcast in that specific cell may then be made automatically by an intelligent agent, preprogrammed according to specified rules (e.g., neighbor cells only, all cells within 100 km and in which the present cell has at least one multicast session in common, etc.), or may be made manually by a network administrator. In another embodiment, each cell may learn which cells' information to broadcast from the network, e.g., each multicast provider decides in which cells the multicast information should be broadcast.

Upon receiving the first cell's link-level access parameters, mobile terminal 227 may retune to receive the multicast broadcast with session identifier "S1," in step 407, and join a multicast group for session S1 in first cell 213, in step 409. Because mobile terminal 227 might not have an uplink to first cell 213 (e.g., in a unidirectional multicast), any request to join a multicast session may be registered by the mobile terminal's operating system and/or the IP stack, and might not send an IGMP join message. After joining the multicast group, mobile terminal 227 receives datagrams addressed to the multicast group for session S1 in first cell 213, in step 411. As mobile terminal 227 travels through cell 213 on road 231 toward location 503, mobile terminal 227 may continue to receive announcements from first cell 213 via the logical announcement channel, in step 413. In step 415, mobile terminal 227 receives a specific announcement including link level access parameters for the second cell.

As mobile terminal 227 transitions from first cell 213 to second cell 215, e.g., as mobile terminal 227 travels from point 503 to point 505, first cell 213's reception may fade, in step 417, such that mobile terminal 227 can no longer receive broadcasts from first cell 213. When first cell 213's broadcast fades out (or is lost due to transmitter malfunction, interference, etc.), mobile terminal 227 may query the stored link-level access parameters for second cell 215, in step 419, and tune to second cell 215, in step 421. After tuning to second cell 215, mobile terminal 227 may join the multicast group for session S1 in second cell 215, in step 423. Upon joining the multicast group, mobile terminal 227 receives datagrams addressed to the multicast group for session S1 in second cell 215, in step 425. After step 425, the handover is complete. However, the process may return to step 413 if or when mobile terminal 227 travels from second cell 215 to yet another cell in which session S1 is available.

It should be appreciated by one of skill in the art that one or more of the above-recited steps may be optional. For instance, step 407 may be performed for DVB-T broadcasts by mobile terminal 227 retuning to a different MAC address or PID. However, other broadcast systems might not perform step 407. It should also be appreciated that mobile terminal 227 may tune to a cell's multicast session broadcast even if that cell's broadcast is not the strongest one currently available to the mobile terminal.

The above method describes an embodiment using signal strength and fading signal strength as a metric to initiate the handover process (step 417). However, one of skill in the art will appreciate that embodiments of this invention may also employ other metrics, or combinations thereof, for initiating the handover in step 417. Examples of alternative metrics include: terminal's historical experience in the network; signal/noise ratio; network capacity; cost; user preferences; user input request; and service quality (e.g. 100 kbps realvideo in one cell, 3 Mbps MPEG2 in another), among others.

Figure 6:
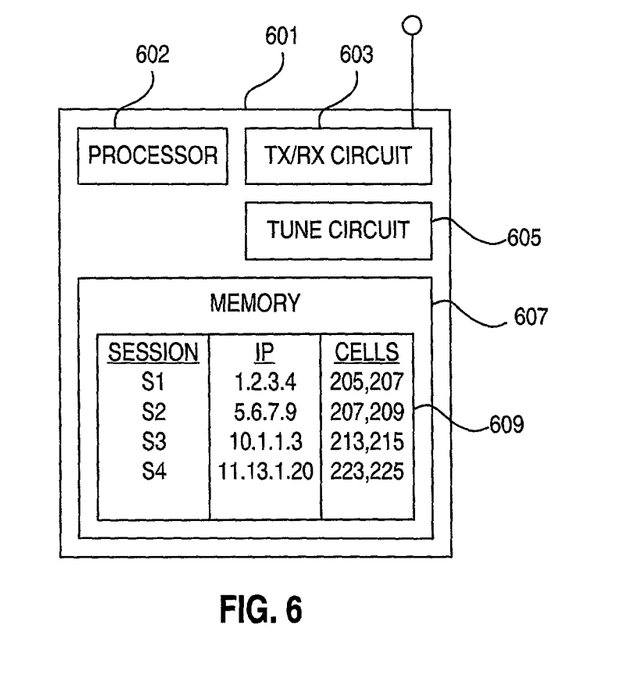
FIG. 6 illustrates a block diagram of a mobile terminal according to an embodiment of the invention.

FIG. 6 illustrates a block diagram of a mobile terminal that may be used with one or more embodiments of the invention. Mobile terminal 601 may include a processor 602, transceiver 603, tuning circuit 605, and memory 607. Memory 607 may store session and mapping information 609. Transceiver 603 may be used by mobile terminal to wirelessly communicate with cells to receive multicast sessions and mapping announcements. Tuning circuit 605 tunes transceiver 603 to a desired channel corresponding to a desired cell in order to receive a multicast session, based on session and mapping information 609 stored in memory 607. More specifically, tuning circuit 605 may direct transceiver 603 to tune to a desired channel of the current cell, such as a logical announcement channel and/or a session multicast broadcast channel. It will be appreciated by those of skill in the art that two or more of the above components may be combined into a single component, and that any of the above components or combinations may be performed via hardware, software, or a combination of the two.

Figure 7:
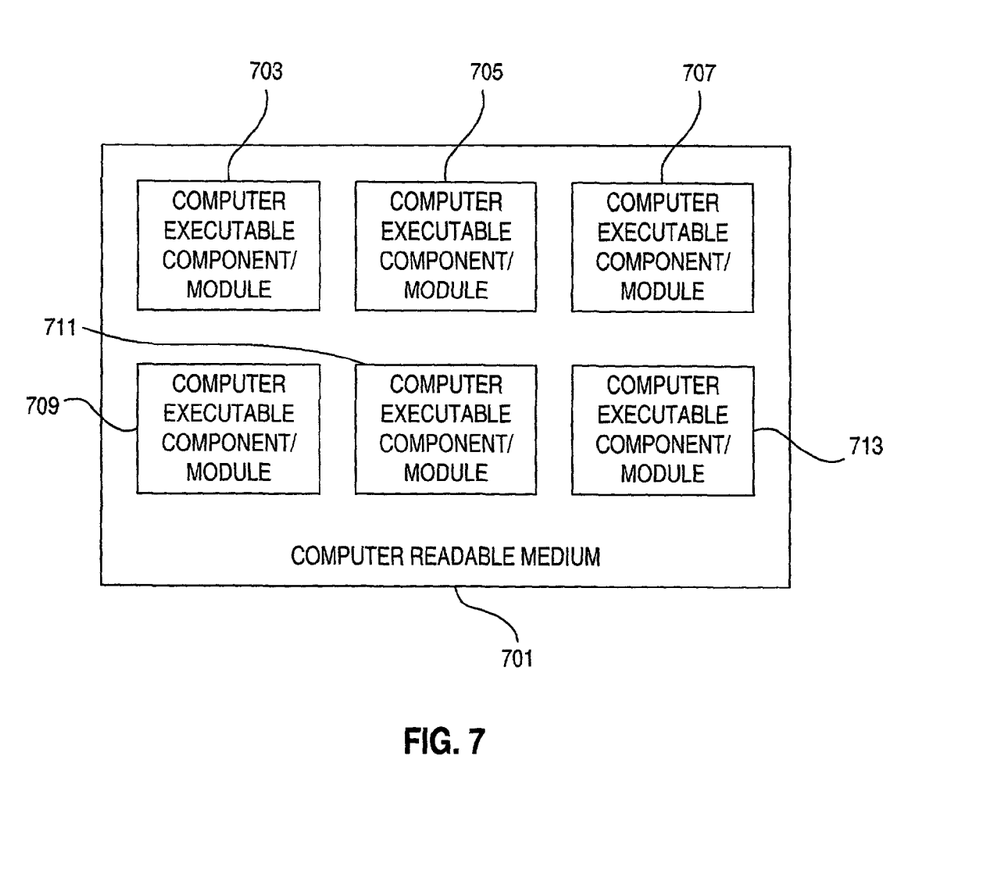
FIG. 7 illustrates a block diagram of a computer readable medium according to an embodiment of the invention.

The inventive methods may be embodied as computer readable instructions stored on a computer readable medium such as a floppy disk, CD-ROM, DVD disk, removable storage device, hard disk, system memory, or other data storage medium. FIG. 7 illustrates a block diagram of a computer readable medium 701 that may be used in accordance with one or more of the above-described embodiments. The computer readable medium 701 stores computer executable components, or software modules, 703-713. More or fewer software modules may alternatively be used. Each component may be an executable program, routine, function, data link library, configuration file, database, graphical image, binary data file, text data file, object file, source code, or the like. When one or more computer processors execute one or more of the software modules, the software modules interact to cause one or more computer systems to perform according to the teachings of the present invention.

The inventive methods and systems may be used for a variety of data messaging applications, including scheduled audio/video, media distribution, file distribution and caching, announcements, monitoring, multimedia conferencing, synchronized resource distribution, concurrent processing, collaboration, distance learning, chat groups, distributed interactive simulations, multi-player games, jam sessions, resource discovery, data collection, auctions, polling, jukebox services, and accounting services, each of which is generally known in the art (see IETF RFC 3170). Those of skill in the art will appreciate that the principles taught herein may be adapted for performing handover for any application (unicast and multicast) in a wireless network.

In addition, while the above examples are directed to a unidirectional multicast system, one of skill in the art will appreciate that the above methods and systems may also be used in a bi-directional multicast system. That is, a mobile terminal may be the originator of a multicast broadcast session to other mobile terminals. Alternatively, a mobile terminal may provide a feedback or ping message to wireless communications network 201 (FIG. 2), from which network 201 can determine a signal strength of the mobile terminal. In such an embodiment, handover decisions may be made by the network at a central location or at ground stations or access routers within each cell.

While the above examples describe the invention with respect to wireless systems, one of normal skill in the art will appreciate that the invention may be embodied using fixed, wired, stationary, wireless, pedestrian, portable, vehicular, and/or mobile networks, as well as other types of networks, including hybrid combinations of any of the above. In addition, the above invention describes several access systems such as WLAN, DVB, DAB that can be used to transfer multicast data. One of skill in the art will appreciate that embodiments of this invention may use other types of systems including, but not limited to, UMTS, GPRS, DVB-T, DVB-S and DVB-C, ATSC (Advanced Television Standards Committee), ISDB-T, PSTN (Public Switched Telephone Network), ISDN (Integrated Services Digital Network), xDSL (Digital Subscriber Line family, ADSL (Asymmetric DSL), VDSL, HDSL), WLAN, BlueTooth, and HyperLAN2. One skilled in the art will appreciate which of these may support a bi-directional channel, which may support a unidirectional channel, and which may support both.

While the above invention generalizes a handover from one cell to a second cell, one of skill in the art will also appreciate that a terminal may be active in many cells simultaneously (receiving data in all) or it may be simultaneously aware of other cells (in the same geographical location as itself) from which it is not actively receiving data. It is therefore possible that handover is performed over two or more of these cells. For example, when moving from a 10 Mbps DVB-T cell to a 100 Kbps UMTS cell, a mobile terminal may need to be active in two UMTS cells in the same physical location in order to maintain the same service or session. Furthermore, one skilled in the art would appreciate that handovers may be horizontal (between similar cells—e.g. GSM to GSM) or vertical (between dissimilar cells, e.g. DVB-T to GSM), or that a multicell handover may involve a combination of horizontal and vertical handovers (e.g. DVB-T cell 1 to GSM cell 2 and DVB-T cell 3).

While the above invention describes multicast joins in general terms, one of normal skill in the art will appreciate that a multicast join may take on several embodiments including, but not limited to, a "local device join" (for example, a UDP socket is opened for a terminal IP stack), a "local system join" (for example, a terminal instructs a separate network gateway device (e.g. modem) to filter for that service), and a "network join" (for example, the terminal sends an IGMP join to a network router). Different embodiments may thus be optimized for different situations. For example, "network joins" may be used when a low cost packet-based return channel is available, and "local device joins" may be used in a handset without an active return channel.

While the above invention describes tuning and retuning in general terms, one of skill in the art will appreciate that there are many embodiments of this functionality. These include, but are not limited to, tuning to different frequencies (physical tuning) and filtering different streams (i.e., logical tuning, e.g. changing component (identified by PID) in a DVB Transport Stream). It will also be apparent that different logical cells may be embodied on different logical channels. For example, two DVB components may represent separate logical cells and therefore a handover may be initiated between them. A particularly useful embodiment of this is where a physical cell has a wide bandwidth (e.g., a 48 Mbps DVB-S transponder) which is partitioned into logical cells for terminals with limited capacity (e.g. only capable of filtering a maximum of 8 PIDs, only capable of a throughput of 8 Mbps on each PID, etc.).

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method, comprising:
   in a first cell, receiving from a base station corresponding to the first cell, a broadcast administrative message communicating multicast information for a plurality of cells comprising the first cell of a first access type, a neighboring horizontal cell of the first access type, and a vertical cell of a second access type, wherein said multicast information includes session information including a multicast IP address for a multicast session, mapping information indicating in which cells the multicast session may be received, topology information mapping logical cells to physical cells, and link-level access parameters usable to connect to the multicast session;
   tuning to the multicast session in the first cell using the received multicast information; and
   when a predetermined condition occurs, tuning to the multicast session in one of the horizontal neighboring cell and the vertical cell using the received multicast information.

2. The method of claim 1, wherein the multicast information comprises a session identifier.

3. The method of claim 1, wherein the multicast information comprises a frequency.

4. The method of claim 1, wherein the multicast information comprises a session title.

5. The method of claim 1, wherein the predetermined condition comprises a signal strength fading.

6. The method of claim 1, wherein the predetermined condition comprises receiving predetermined user input.

7. The method of claim 1, wherein each tuning comprises receiving a digital video broadcast terrestrial (DVB-T) multicast session.

8. The method of claim 1, wherein each tuning comprises receiving a UMTS ulticast session.

9. The method of claim 1, further comprising the step of joining an IP multicast group in the first cell.

10. The method of claim 1, further comprising the step of periodically receiving multicast session announcements including the multicast information while tuned to the multicast session in the first cell.

11. A method, comprising:
    in a first cell, receiving from a base station corresponding to the first cell, multicast information for a plurality of cells comprising the first cell of a first access type, a neighboring horizontal cell of the first access type, and a vertical cell of a second access type, wherein said multicast information includes session information including a multicast IP address for a multicast session, mapping information indicating in which cells the multicast session may be received, topology information mapping logical cells to physical cells, and link-level access parameters usable to connect to the multicast session;
    tuning to the multicast session in the first cell using the received multicast information; and
    when a predetermined condition occurs, tuning to the multicast session in one of the horizontal neighboring cell and the vertical cell using the received multicast session information, wherein each tuning comprises using the link-level access parameters to tune to the multicast session in each cell.

12. An apparatus, comprising:
a processor; and
memory for storing computer readable instructions that, when executed by the processor, cause the apparatus to perform:
in a first cell, receiving from a base station corresponding to the first cell, a broadcast message communicating multicast information for a plurality of cells comprising the first cell of a first access type, a neighboring horizontal cell of the first access type, and a vertical cell of a second access type, wherein said multicast information includes session information including a multicast IP address for a multicast session, mapping information indicating in which cells the multicast session may be received, topology information mapping logical cells to physical cells, and link-level access parameters usable by the apparatus to connect to the multicast session;
tuning to the multicast session in the first cell using the received multicast information; and
when a predetermined condition occurs, tuning to the multicast session in one of the horizontal neighboring cell and the vertical cell using the received multicast information.

13. The apparatus of claim 12, wherein the multicast information comprises a session identifier.

14. The apparatus of claim 12, wherein the multicast information comprises a frequency.

15. The apparatus of claim 12, wherein the multicast information comprises a session title.

16. The apparatus of claim 12, wherein each tuning comprises receiving a digital video broadcast terrestrial (DVB-T) multicast session.

17. The apparatus of claim 12, wherein each tuning comprises receiving a UMTS multicast session.

18. The apparatus of claim 12, wherein each tuning comprises using the link-level access parameters to tune to the multicast session in each cell.

19. The apparatus of claim 12, wherein the computer readable instructions, when executed by the processor, further cause the apparatus to perform joining an IP multicast group in the first cell.

20. The apparatus of claim 12, wherein the computer readable instructions, when executed by the processor, further cause the apparatus to perform periodically receiving multicast session announcements including the multicast information while tuned to the multicast session in the first cell.

21. The apparatus of claim 12, wherein the predetermined condition comprises a signal strength fading.

22. The apparatus of claim 12, wherein the predetermined condition comprises receiving predetermined user input.

23. A computer readable medium storing computer readable instructions that, when executed, cause a data processing device to perform:
in a first cell, receiving from a base station corresponding to the first cell, a broadcast message communicating multicast session information for a plurality of cells comprising the first cell of a first access type, a neighboring horizontal cell of the first access type, and a vertical cell of a second access type, wherein said multicast information includes session information including a multicast IP address for a multicast session, mapping information indicating in which cells the multicast session may be received, topology information mapping logical cells to physical cells, and link-level access parameters usable by the data processing device to connect to the multicast session;
tuning to the multicast session in the first cell using the received multicast information; and
when a predetermined condition occurs, tuning to the multicast session in one of the horizontal neighboring cell and the vertical cell using the received multicast session information.

24. The computer readable medium of claim 23, wherein the multicast information comprises a session identifier.

25. The computer readable medium of claim 23, wherein the multicast information comprises a frequency.

26. The computer readable medium of claim 23, wherein the multicast information comprises a session title.

27. The computer readable medium of claim 23, wherein each tuning comprises receiving a digital video broadcast terrestrial (DVB-T) multicast session.

28. The computer readable medium of claim 23, wherein each tuning comprises receiving a UMTS multicast session.

29. The computer readable medium of claim 23, wherein each tuning comprises using the link-level access parameters to tune to the multicast session in each cell.

30. The computer readable medium of claim 23, wherein the computer readable instructions, when executed by the processor, further cause the data processing device to perform joining an IP multicast group in the first cell.

31. The computer readable medium of claim 23, wherein the computer readable instructions, when executed by the processor, further cause the data processing device to perform periodically receiving multicast session announcements including the multicast information while tuned to the multicast session in the first cell.

32. The computer readable medium of claim 23, wherein the predetermined condition comprises a signal strength fading.

33. The computer readable medium of claim 23, wherein the predetermined condition comprises receiving predetermined user input.

34. A method, comprising:
tuning to a logical announcement channel;
receiving a session announcement corresponding to a multicast session, the session announcement comprising information that maps link-level access parameters in each of a plurality of cells to the multicast session, wherein said session announcement includes a session identifier, session information including metadata regarding the multicast session, and session cell mapping information indicating those cells in which the multicast session with the specified session identifier is available;
receiving the multicast session in a first cell of the plurality of cells using the first cell's received link-level access parameters; and
when reception of the multicast session in the first cell changes from a first signal strength, receiving the multicast session in a second cell of the plurality of cells using the second cell's link-level access parameters contained in the session announcement.

35. The method of claim 34, wherein receiving the multicast session in the first cell and receiving the multicast session in the second cell each comprise tuning to a digital video broadcast terrestrial (DVB-T) multicast session.

36. The method of claim 34, wherein receiving the multicast session in the first cell and receiving the multicast session in the second cell each comprise tuning to a UMTS multicast session.

37. An apparatus, comprising:
a processor; and
memory for storing computer readable instructions that, when executed, cause the apparatus to perform:
wirelessly receiving from a base station corresponding to a first cell, a broadcast message communicating multicast information for the first cell of a first access type, a neighboring horizontal cell of the first access type, and a vertical cell of a second access type, wherein said multicast information includes session information including a multicast IP address for a multicast session, mapping information indicating in which cells the multicast session may be received, topology information mapping logical cells to physical cells, and link-level access parameters usable by the apparatus to connect to the multicast session;
wirelessly tuning to the multicast session broadcast by the base station corresponding to the first cell using the received multicast information for the first cell; and
when a predetermined condition occurs, wirelessly tuning to a corresponding multicast session broadcast by a base station corresponding to the horizontal neighboring cell using the received multicast information for the horizontal neighboring cell.

38. The apparatus of claim 37, wherein each multicast information comprises a session identifier.

39. The apparatus of claim 37, wherein each multicast information comprises a frequency.

40. The apparatus of claim 37, wherein each multicast information comprises a session title.

41. The apparatus of claim 37, wherein each tuning comprises wirelessly receiving a digital video broadcast terrestrial (DVB-T) multicast session.

42. The apparatus of claim 37, wherein each tuning comprises wirelessly receiving a UMTS multicast session.

43. The apparatus of claim 37,
wherein each tuning comprises using the link-level access parameters to tune to the multicast session in each respective cell.

44. The apparatus of claim 37, wherein the computer readable instructions, when executed by the processor, further cause the apparatus to perform periodically receiving multicast session announcements including the multicast information while tuned to the multicast session in the first cell.

45. The apparatus of claim 37, wherein the predetermined condition comprises a fading of the signal strength of the first cell.

46. The apparatus of claim 37, wherein the predetermined condition comprises receiving predetermined user input.

47. A method, comprising:
prior to determining that a handoff from a first cell to a different cell should be made for a mobile terminal located in the first cell, transmitting from a base station corresponding to the first cell, a broadcast message communicating multicast information for a plurality of cells comprising the first cell of a first access type, a neighboring horizontal cell of the first access type, and a vertical cell of a second access type, wherein said multicast information includes session information including a multicast IP address for a multicast session, mapping information indicating in which cells the multicast session may be received, topology information mapping logical cells to physical cells, and link-level access parameters usable by the mobile terminal to connect to the multicast session;
receiving, by the mobile terminal in the first cell, the broadcast message communicating the multicast information;
tuning the mobile terminal to receive to the multicast session in the first cell using the received multicast information; and
when a predetermined condition occurs, tuning the mobile terminal to receive the multicast session in one of the horizontal neighboring cell and the vertical cell using the received multicast information.

48. An apparatus, comprising:
a processor; and
memory for storing computer readable instructions that, when executed, cause the apparatus to:
tune to a logical announcement channel;
receive a session announcement corresponding to a multicast session, the session announcement comprising information that maps link-level access parameters in each of a plurality of cells to the multicast session, wherein said session announcement includes a session identifier, session information including metadata regarding the multicast session, and session cell mapping information indicating those cells in which the multicast session with the specified session identifier is available;
receive the multicast session in a first cell of the plurality of cells using the first cell's received link-level access parameters; and
when reception of the multicast session in the first cell changes from a first signal strength, receive the multicast session in a second cell of the plurality of cells using the second cell's link-level access parameters contained in the session announcement.

49. The apparatus of claim 48, wherein receiving the multicast session in the first cell and receiving the multicast session in the second cell each comprise tuning to a digital video broadcast terrestrial (DVB-T) multicast session.

50. The apparatus of claim 48, wherein receiving the multicast session in the first cell and receiving the multicast session in the second cell each comprise tuning to a UMTS multicast session.

* * * * *

UNITED STATES PATENT AND TRADEMARK OFFICE
CERTIFICATE OF CORRECTION

| | | |
|---|---|---|
| PATENT NO. | : 8,068,832 B2 | |
| APPLICATION NO. | : 09/988241 | |
| DATED | : November 29, 2011 | |
| INVENTOR(S) | : Toni Paila et al. | |

It is certified that error appears in the above-identified patent and that said Letters Patent is hereby corrected as shown below:

Title page, Item (75)

Under the Inventors:
    Delete "Paikela" and insert -- Poikela --

Column 8, Claim 8, Line 45:
    Delete "ulticast" and insert -- multicast --

Signed and Sealed this
Twelfth Day of June, 2012

David J. Kappos
*Director of the United States Patent and Trademark Office*